W. L. MORRIS.
FILTER.
APPLICATION FILED DEC. 27, 1910.
1,143,985.
Patented June 22, 1915.
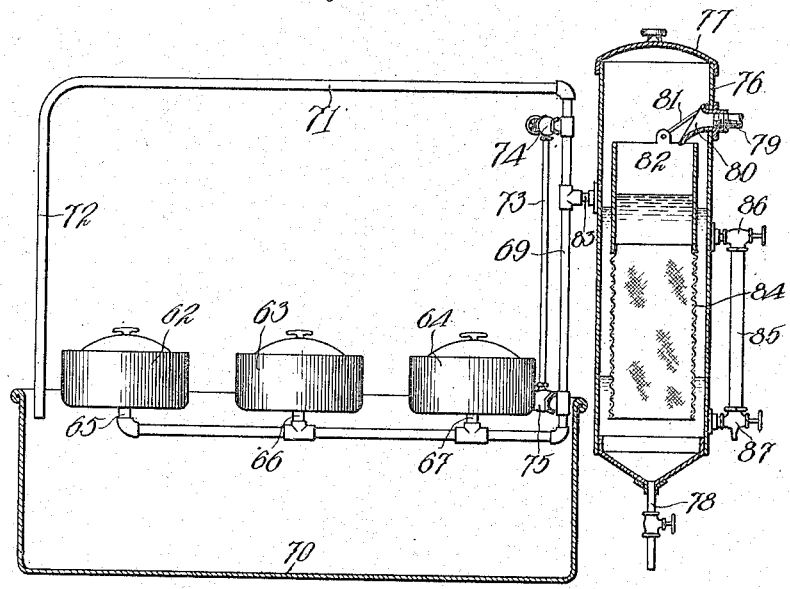
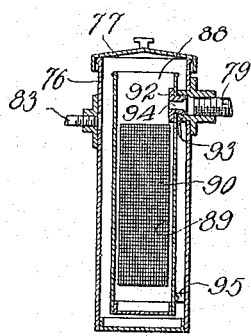
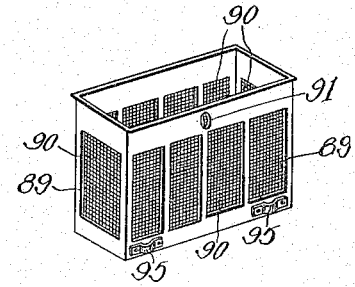
Witnesses:
Leo J. Dumais
W. T. Olson
Inventor:
William L. Morris
by Bruce Nissen & Sprindle
Attys.

UNITED STATES PATENT OFFICE.

WILLIAM L. MORRIS, OF CHICAGO, ILLINOIS, ASSIGNOR TO S. F. BOWSER & COMPANY, INC., OF FORT WAYNE, INDIANA, A CORPORATION OF INDIANA.

FILTER.

1,143,985. Specification of Letters Patent. Patented June 22, 1915.

Application filed December 27, 1910. Serial No. 599,254.

*To all whom it may concern:*

Be it known that I, WILLIAM L. MORRIS, a citizen of the United States, residing at Chicago, in the county of Cook and State of Illinois, have invented certain new and useful Improvements in Filters, of which the following is a specification.

This application is a division of my application Serial No. 557,318, filed April 25, 1910, with the exception of Figures 2 and 3, which show a modified form of separator, and has for its primary object to provide an improved construction, combination and arrangement of parts in oil filters.

Another object is to provide improved means for maintaining a pressure head upon one or more filters.

Another object is to provide improved means for removing water and other relatively heavy portions of the fluid before its passage through the filter.

Other and further objects will appear in the specification and be more specifically pointed out in the claims, reference being had to the accompanying drawings exemplifying the invention, and in which—

Fig. 1 is a view, partly in section, illustrating an embodiment of my invention; Fig. 2 is a vertical sectional view of another form of separator, and Fig. 3 is a perspective of the separator.

A plurality of filters 62, 63 and 64, Fig. 1, are connected by vertical branches 65, 66 and 67 to a main 68, said main being provided with a vertically extending portion 69 to form a standpipe for maintaining a head in each of the filters. Disposed beneath the filters 62, 63, 64 is a vessel 70 of any suitable construction for receiving the filtered oil which overflows from said filters. In order to provide an overflow for the standpipe 69, said standpipe is provided with a laterally projecting portion 71, and a downwardly depending portion 72 discharging into the vessel 70. A sight-gage for registering the elevation of the oil in the standpipe 69 is provided by a glass tube 73 interposed between a valve socket 74 and another valve socket 75, adjacent the upper and lower ends of the standpipe 69. Disposed to the right of Fig. 1 and connected to the standpipe 69 is a separator of peculiar construction. Said separator comprises a cylindrical housing 76 provided with a removable cap 77 and below with a drain cock 78 through which precipitated water and other impurities may be drawn off as occasion demands. Discharging into the upper end of the casing 76 is a pipe 79 provided with a flared inlet 80 over which engages the bail 81 of a separating device. Said separating device comprises a cylindrical imperforate shell 82 extending down below a tubular connection 83 connecting the upper end of the housing 76 with the stand pipe 69. The lower end of the separating device consists of a cylindrical screen or filter 84 which depends to a point adjacent the bottom of the housing 76. When the mixture of oil and water is introduced through the inlet 80 into the separator 82, the water becomes separated by gravity from the oil, thus forcing the oil to the top. It will therefore be seen that as fluid rises in the housing 76, the oil will always be on top and will therefore pass through the tubular connection 83 to the filters. A sight gage 85 connects above and below through the valve cocks 86, 87 with the housing 76. This sight gage is for the purpose of ascertaining the amount of water within the housing 76, so that when the water is excessive, it may be drawn off through the drain cock 78 at the bottom of the housing. This feature of separating the water from the oil by introducing the adulterated oil to the filters 62, 63, 64 is of great importance, since, should water gain access to these filters, it would choke up the filter screens and prevent the passage of oil therethrough, thus greatly vitiating the action of the filters.

As shown in Fig. 2, the separator screen 88 comprises a body which is preferably constructed of sheet metal, the lower portion of which is provided with openings 89 in the walls thereof and these openings are covered by suitable reticulated material 90. The body portion of the screen is provided with an aperture or opening 91 through one wall thereof adjacent the top and the screen is held in position by means of a nipple 92 which is passed through the opening 91 from the inside of the screen and the extremity of the nipple is adapted to be screwed into the extremity of the collar 93 which latter projects into the housing 76 to hold the screen spaced from the wall of the housing. The inlet pipe 79 is connected with the collar 93 and the aperture 94 in the nipple 92 registers with the end of the pipe so that the liquid can be discharged into the screen through the nipple.

The lower portion of the screen is held spaced from the wall of the housing in any desired or suitable manner, preferably by means of spacing lips or projections 95 secured to the screen body and which have engagement with the housing wall.

In operation, the fluid to be filtered is introduced into the stand pipe 69 at the top thereof or at a point adjacent the top. The filters 62, 63 and 64 are of a closed type and, as before explained, are connected in parallel so that any one or all of the filters are fed from the stand-pipe. The stand-pipe receives the over-flow of fluid from the separator so that a certain head of fluid to be filtered is maintained in the stand-pipe 69, the head of fluid in the stand-pipe indicating the condition or cleanliness of the filters, because of the fact that if the filters are dirty it will require a greater pressure and consequently a greater head of liquid to force the liquid through the filters. In order to observe the head of oil in the stand-pipe a gage glass 73 is connected parallel with the stand-pipe to indicate the head of oil therein and to show the condition of the filters by showing the head of oil in the stand-pipe. It will be observed that even though the filters are entirely stopped up the liquid will not be spilled from the separator receptacle because of the over-flow connection with the stand-pipe which discharges into the vessel 70 for containing the filtered liquid. This apparatus is particularly adapted for use with filters of a closed type; that is, filters into which the liquid to be filtered is introduced on the inside of a closed filtering medium.

What is claimed as new is—

1. The combination with a filter, of a stand-pipe connected to the filter and adapted to provide a pressure head for the fluid fed to the filter, and a cleanliness indicator consisting of a gage glass in connection with the stand-pipe for showing the variable height of liquid in the stand-pipe necessary to force the liquid to be filtered through the filter thereby indicating the cleanliness of the filter.

2. The combination with a filter, of a stand-pipe connected to the filter and adapted to provide a pressure head for fluid fed to the filter, means for discharging fluid to the stand-pipe, and a cleanliness indicator consisting of a gage glass in connection with the stand-pipe for showing the variable height of liquid in the stand-pipe necessary to force the liquid to be filtered through the filter, thereby indicating the cleanliness of the filter.

3. The combination of a plurality of closed filters adapted to receive fluid under pressure from a common source, a pipe to provide a pressure head for fluid to be filtered, means for discharging liquid to be filtered to the stand-pipe, a cleanliness indicator for the filters consisting of a gage glass connected to the stand-pipe, and a filter pressure relief consisting of a pipe connected to the stand-pipe adjacent the top thereof constituting an overflow.

4. The combination with a plurality of filters, of a stand-pipe connected to the filters in parallel and adapted to provide a pressure head for the fluid fed to the filters, means for connecting and disconnecting each of the separate filters from the parallel connection, a separator for discharging fluid into the top of the stand-pipe, and a cleanliness indicator consisting of a gage glass in connection with the stand-pipe for showing a variable height of liquid in the stand-pipe necessary to force the liquid to be filtered through the filters, thereby indicating the cleanliness of the filters.

5. The combination with a plurality of separate filter units, of a stand-pipe connected in parallel thereto, a cleanliness indicator tube in connection with the stand-pipe for showing a variable height of liquid in the stand-pipe, and an over-flow separator adapted to discharge over-flow liquid from the top of the stand-pipe.

6. The combination with a clean oil receptacle, of a plurality of separate filter units therefor adapted to be separately opened and closed, a stand-pipe connected in parallel with the filter units, a cleanliness indicator connected to the stand-pipe consisting of a gage glass to show a variable height of oil in the stand-pipe, a separator for oil and water adapted to discharge oil from the upper surface thereof into the stand-pipe adjacent the top thereof, and a pressure relief consisting of a pipe connected to the stand-pipe below the top of the separator and discharging into the clean oil receptacle.

7. The combination with a plurality of filter units, of a stand-pipe connected in parallel thereto, a cleanliness indicator consisting of a gage glass connected to the stand-pipe, an over-flow separator discharging the over-flow liquid at the top of the stand-pipe comprising an inner imperforate shell extending above the over-flow line in the separator, means for discharging incoming liquid within the shell whereby water mixed with oil will pass to the bottom of the separator, and a pressure relief consisting of a pipe connected to the stand-pipe extending above the top of the imperforate shell and below the top of the separator.

8. The combination with a plurality of filter units, of a standpipe connected in parallel thereto, an overflow separator discharging the overflow liquid at the top of the standpipe comprising an inner imperforate shell extending above the overflow line in the separator, means for discharging incoming liquid within the shell whereby water mixed with oil will pass to the bottom of the separator, and a pressure relief consisting of a pipe connected to the standpipe extending above the top of the imperforate shell and below the top of the separator.

9. The combination with a filter, of a vessel connected to the filter and adapted to provide a pressure head for fluid fed to the filter, means for discharging fluid to the vessel at a less rate than the capacity of the filter, and a cleanliness indicator consisting of a gage in relation to the vessel for showing the variable height of liquid in the vessel necessary to force the liquid to be filtered through the filter, thereby indicating the cleanliness of the filter.

10. The combination with a filter, of a vessel connected to the filter and adapted to provide a pressure head for fluid fed to the filter, means for discharging fluid to the filter at a less rate than the capacity of the filter, and a cleanliness indicator consisting of a gage for showing the variable top surface of liquid in the vessel as balanced by the resistance of said filter, thereby showing the extent of clogging of the filter.

In testimony whereof I have signed my name to this specification, in the presence of two subscribing witnesses, on this 1st day of December A. D. 1910.

WILLIAM L. MORRIS.

Witnesses:
   J. W. BURROWS,
   R. E. FLEMING.

Copies of this patent may be obtained for five cents each, by addressing the "Commissioner of Patents, Washington, D. C."